United States Patent [19]

Vagač et al.

[11] 4,334,984
[45] Jun. 15, 1982

[54] APPARATUS FOR PROCESSING LOW-GRADE WASTE PAPER

[75] Inventors: Svetozár Vagač; Anton Kostka; Milan Cársky; Lubor Sedláček; Jaroslav Navratil, all of Bratislava; Jiri Mueller, Litovel; Rudolf Kmeco, Litovel; Václav Knob, Litovel, all of Czechoslovakia

[73] Assignee: Vyzkumny ustav papieru a celulozy, Bratislava, Czechoslovakia

[21] Appl. No.: 230,313

[22] Filed: Feb. 2, 1981

Related U.S. Application Data

[63] Continuation-in-part of Ser. No. 87,929, Oct. 25, 1979, abandoned.

[30] Foreign Application Priority Data

Oct. 26, 1978 [CS] Czechoslovakia ............... 6953-78

[51] Int. Cl.³ ..................... B03B 7/00; B03B 9/06
[52] U.S. Cl. .................................. 209/3; 209/12; 162/4; 162/55

[58] Field of Search ............... 162/4, 55, 242; 209/3, 209/12; 241/28

[56] References Cited

U.S. PATENT DOCUMENTS

| | | | |
|---|---|---|---|
| 3,849,245 | 11/1974 | Marsh et al. | 162/4 |
| 3,849,246 | 11/1974 | Raymond et al. | 162/4 |
| 3,933,577 | 1/1976 | Pengue | 162/4 |
| 4,133,747 | 1/1979 | Visman | 20 9/10 |
| 4,200,486 | 4/1980 | Vagac et al. | 162/4 |
| 4,231,526 | 11/1980 | Ortner et al. | 162/4 |

Primary Examiner—William F. Smith

[57] ABSTRACT

Apparatus for processing low-grade collected waste paper. Short, so-called zero fibers, which form up to 30 percent of the whole material, and which substantially reduce the quality of paper manufactured therewith are removed, and the bonding properties of the long fiber fraction are removed. It is possible by use of the apparatus to process to paper of good quality from collected low-grade waste paper without previous manual separation of different kinds of waste paper.

4 Claims, 1 Drawing Figure

LEGEND
Reference Characters:

1 - pulper
2 - extraction plate
3 - diluting tank
5 - classifier of heavy components
6 - repulper
7 - classifier of large components
8 - diluting tank
10 - first-stage fractionizer
11 - thickener of the long fiber fraction
12 - activizer
13 - mixing tank
15 - screen classifier
16 - first-stage groove classifier

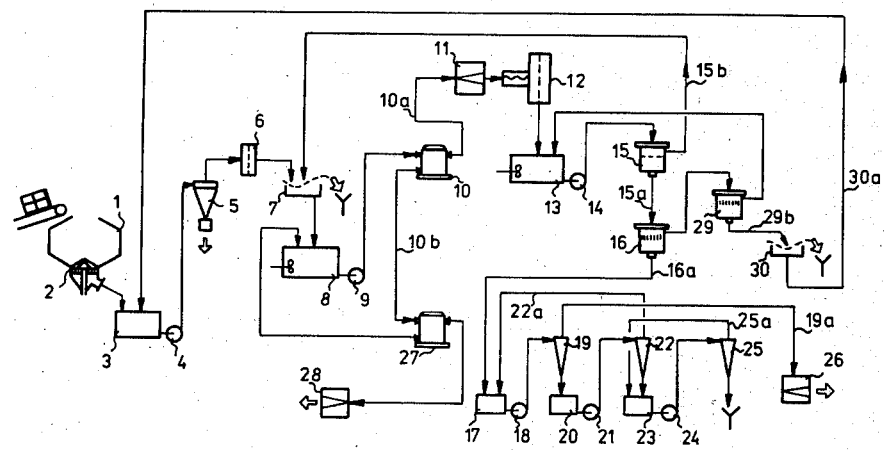

17 - inlet tank
19 - first-stage centrifugal separator
20 - throughflow tank
21 - throughflow pump
22 - second-stage centrifugal separator
23 - outlet tank
25 - third-stage centrifugal separator 26 - thickener of the long fraction
27 - fractionizer (second-stage)
28 - thickener of the short fiber fraction
29 - second-stage groove classifier
30 - final vibrating screen

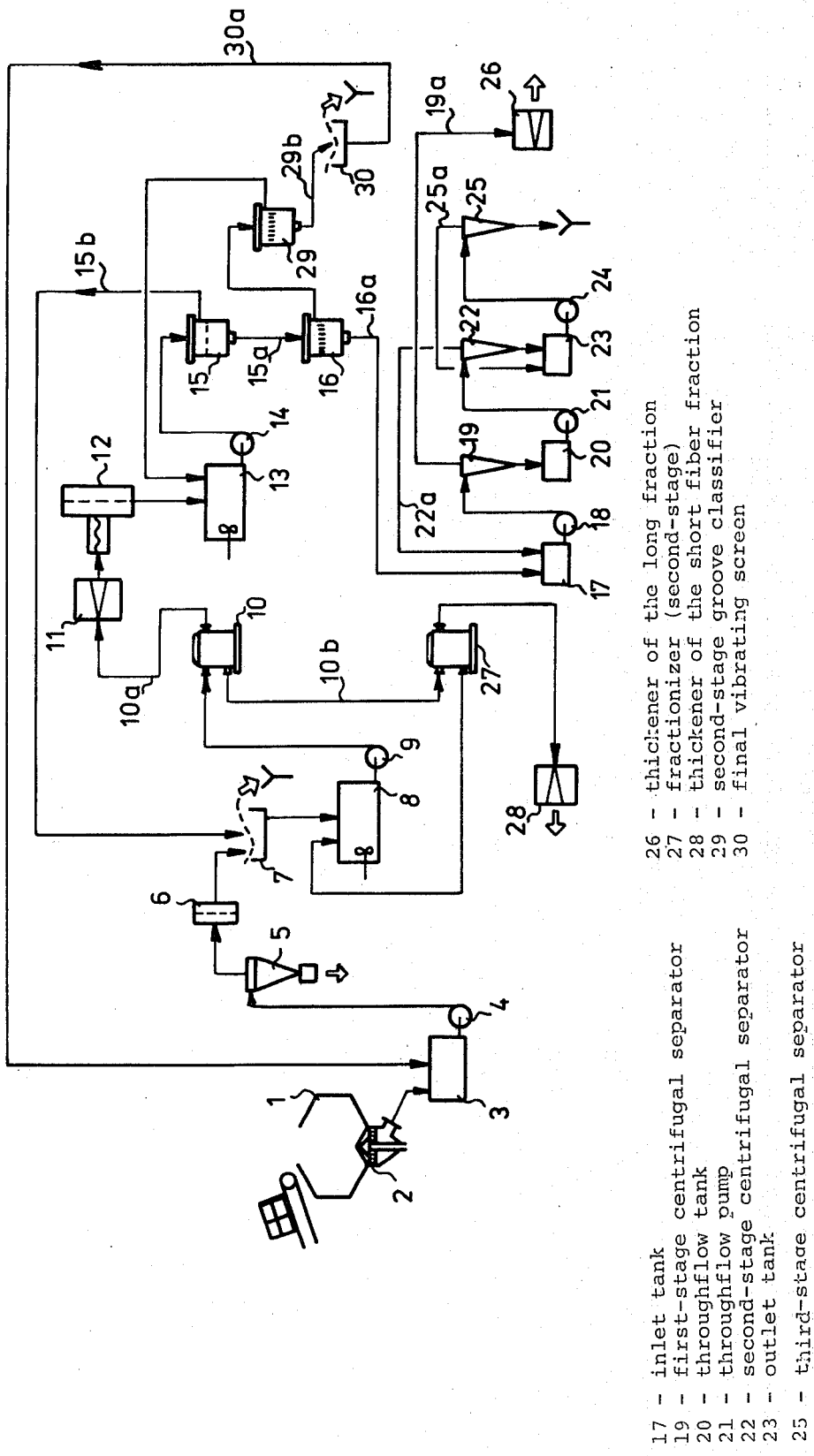

LEGEND
Reference Characters:

1 – pulper
2 – extraction plate
3 – diluting tank
5 – classifier of heavy components
6 – repulper
7 – classifier of large components
8 – diluting tank
10 – first-stage fractionizer
11 – thickener of the long fiber fraction
12 – activizer
13 – mixing tank
15 – screen classifier
16 – first-stage groove classifier
17 – inlet tank
19 – first-stage centrifugal separator
20 – throughflow tank
21 – throughflow pump
22 – second-stage centrifugal separator
23 – outlet tank
25 – third-stage centrifugal separator
26 – thickener of the long fraction
27 – fractionizer (second-stage)
28 – thickener of the short fiber fraction
29 – second-stage groove classifier
30 – final vibrating screen

APPARATUS FOR PROCESSING LOW-GRADE WASTE PAPER

This application is a continuation-in-part of application Ser. No. 87,929, filed Oct. 25, 1979 abandoned.

BACKGROUND OF THE INVENTION

The invention relates to an arrangement for processing collected low-grade waste paper.

The problem of the processing and utilization of the major part of collected waste paper is attaining more and more importance in the whole civilized world. Sources of fresh wood material are already exhausted in many countries; in other countries their exhaustion is only a question of a short time. That means that any further increase in the manufacture of paper and cardboard can be accomplished substantially only by repeated utilization of collected waste paper for their manufacture.

The present trend aims primarily at the processing of wastepaper of better qualities, the demand for which is steadily increasing in the manufacture of paper. Disproportion between supply and demand are arising. This disproportion is usually solved by increasing the number of categories of collected waste paper. Each individual category is suitable for the manufacture of a certain kind of paper or cardboard.

The advantages of this kind of categorization of collected waste paper are that newly developed machines for processing waste paper can reckon with a supplied homogenous material for which they are designed, thereby providing paper of better qualities, either mechanical or visual.

A drawback of this kind of categorization is that waste paper which does not comply for any reason with given standards cannot be used at all and becomes a problem waste.

In order also to permit processing of waste paper which by its qualities does not comply with requirements to be included in a certain quality category, some large enterprises have proposed methods and arrangements for its processing.

The following patent specifications, namely the German Offenlegungsschrift No. 1,008.562 and No. 2,413,278, and U.S. Pat. No. 4,000,031 deal with the possibilities of obtaining fibers from laminated paper material. In the U.S. Pat. Nos. 3,736,223; 3,849,245 and 3,849,246 there are described possibilities of processing very contaminated waste containing paper, fats, metal, glass, bitumins, waxes and the like. Processing of waste paper of low quality is described in the German Offenlegungsschrift No. 2,413,159 and in U.S. Pat. Nos. 3,957,572 and 1,017,033 whereby for release of paper fibers and admixtures the principle of very intensive action of shearing forces in special devices is applied. The possibility of separating from the fibrous material obtained from waste corrugated cordboard two fractions according to the length of fibers is disclosed in U.S. Pat. No. 3,125,150.

A common drawback of these mentioned arrangements is that, with a simultaneous removal of unwelcome admixtures of paper, they do not permit the mechanical properties of the fibrous material obtained from waste paper to be improved. This is due to the high content of dead short fractions with an insufficient activity of good long fibers.

Under the term "low-grade collected waste paper" unclassified collected waste or the so-called "waste basket collection" is to be understood. Such waste paper contains small amounts of non-paper admixtures (sheet clips, bookbinding board, carbon paper, foamed polystyrene from corrugated board boxes, etc.) The term is not meant to comprise waste which is predominantly of specific paper types such as Al-foil coated paper, waxes paper and paper coated with hot-melts and paper/plastic laminates.

At present, the paper waste collection in Czechoslovakia amounts to about 390,000 ton per annum, of which up to 70 percent is mixed collection and only 30 percent pure paper classes. In an endeavor to raise in the future the consumption of waste paper in paper-making industry, attempts have been made to admix the low-grade waste with the high-grade one. The present invention provides a system which, due to its specific arrangement, permits the use of low-grade waste paper for this purpose by selecting good paper fibers and activizing them for further processing. The system makes it possible to gradually free paper in the form of an aqueous suspension from heavy impurities and then to disintegrate it into a fine structure, further to fractionize off unwanted fine components, activize usable fibers, separate thermoplastic materials and medium-sized impurities and, finally, to separate extra-fine contaminants. Since the invention originates from specific conditions and is designed for specific purposes (as for a large factory for processing low-grade waste paper), it solves the problem of reclaiming low-grade waste in a new and progressive plant.

SUMMARY OF THE INVENTION

It is an object of this invention to provide an arrangement for processing low-grade waste paper, which, by the reduction of the content of short, so-called dead fibers and by the improved activity of good long fibers, permits the use of low-grade waste paper for further processing.

According to this invention, the preliminary classified pre-treated pulped material collected in a diluting tank is connected through a pump to a first-stage fractionizer, the outlet of the long fraction being connected to the inlet of a thickener connected in turn through an activizer to a mixing tank and through a mixing pump to a screen classifier. The outlet of the sorted suspension of waste paper is furthermore connected to a groove classifier, the outlet opening of the classified suspension of waste paper being connected through a system of tanks, pumps and centrifugal separators to a long fraction thickener. The first-stage fractionizer is furthermore connected through the outlet of the short fraction to a second-stage fractionizer, and the outlet of the short fraction is connected to a short fraction thickener. The outlet of the flushed-out material of the first-stage groove classifier is connected through a second-stage groove classifier and a vibration screen to a collecting tank and through the outlet for flushed-out material of the second-stage groove classifier to a mixing tank and the outlet of the flushed-out material from the screen classifier is connected to a vibration screen.

The terms "fractionizer", "screen classifier", "groove classifier", and "activizer" as employed herein are defined as follows:

Fractionizer means a device designed for strictly selectively dividing a fibrous suspension into two parts, viz., in the present case, one part being fibers usable in the paper making industry, and the other part comprising fine particles such as fiber fractions, crushed fibers, fine sand, dyestuffs, printing ink and china clay. The fractionizer structure distinguishes from that of usual pressure classifiers. The separation of particles of, for example, the same chemical composition but of different shape, is frequently called "fractionation" in professional language; this aptly describes the function of the fractionizer used in the practice of the present invention.

*Activizer* is a device designed, for the purpose of the present invention, for regenerating the activity of bonding potential which is characteristic for the fiber surface. At present, there are known several systems practically all of which are based upon the principle of utilizing frictional forces between the surface of working elements and fibers, that is inter-fiber friction. The function of an activizer can be assumed, for instance, by a disk mill operating at a sufficient density, a kneading and dispersing device, as well as devices with which tangential frictional forces between two screens are availed of, the screens being driven to move at different speeds.

The wall of cellulose fiber, which by its shape reminds one of a tubular spindle-like solid, is composed of several layers. After multiple wetting and re-drying of the fiber, a crustification of its superficial layers occurs. It is the activizing device that serves for exposing the deeper, not yet crustified layers.

*The screen classifier* serves for separating those particles from the activated fibrous suspension that have an undesirable size, shape, etc. In the case of the present invention, the classifier is provided with circular perforations so that it is capable of retaining all the impurities that are larger than the screen holes, provided they are sufficiently rigid; further, it retains subtle and hard impurities as well as smaller undefiberizable components. However, it cannot retain spherical impurities smaller than the screen holes, foamed polystyrene and foil particles.

*The groove (or slit) classifier* is designed for separating foamed polystyrene particles, larger spherical impurities, and plastic foil particles. The classifier comprises a basket provided with grooves or slits (of about 0.35 mm in width) which are substantially narrower than the diameter of screen classifier holes (from 2 to 2.5 mm). Such classifiers are easily available on the market. This classifier type operates with a relatively large amount of minus mesh material when applied to the treatment of strongly contaminated paper waste. This is why a second stage of classification is considered.

The main advantage of the arrangement according to this invention is that it permits the removal of all non-paper components and the fractionizing of the pulp to a long and a short fraction, thus providing the conditions for further processing of the fraction with the long fibers in order to achieve higher mechanical strength with satisfactory visual cleanliness. The part of the short fraction is equally directly prepared for utilization as it is thickened to such a degree as to permit its transport to the user. The arrangement permits the processing of collected waste paper of low classes of quality without its previous dry classifying.

DESCRIPTION OF THE DRAWING

The attached drawing is a diagram of an arrangement according to this invention for the processing of low-grade collected waste paper, and a legend for the main components of the arrangement.

DESCRIPTION OF PREFERRED EMBODIMENT

The arrangement as shown in the drawing comprises a pulper 1 with an extraction plate 2, a diluting tank 3, a pump 4, a classifier 5 of heavy components, a repulper 6, a classifier 7 of large components, a diluting tank 8, a pump 9, a first-stage fractionizer 10, a second-stage fractionizer 27, a thickener 28 of the short fiber fraction, a thickener 11 of the long fiber fraction, an activizer 12, a mixing tank 13, a mixing pump 14, a screen classifier 15, a two-stage groove classifier composed of a first-stage groove or slit classifier 16 and a second-stage groove or slit classifier 29, a final vibrating screen 30, an inlet tank 17, an inlet pump 18, a first stage of centrifugal separators 19, a thickener 26 of the long fraction, a throughflow tank 20, a throughflow pump 21, a second-stage centrifugal separator 22, an outlet tank 23, an outflow pump 24, and a third stage of centrifugal separators 25. The fractionizers 12 and 27, the activizer 12, the screen classifier 15, and the groove or slit classifiers 16 and 29 have the structures and manners of operation described above.

The arrangement according to this invention operates so that low-grade waste paper is dosed into the pulper 1, where it is shredded so that suspension of its fibers passes through the fine perforations of the extraction plate 2 of the pulper 1 and is collected in the diluting tank 3, which is pumped by the pump 4 to the classifier 5 of heavy components and through the repulper 6 to the classifier 7 of large components. The suspension of finely fiberized waste paper, deprived of coarse contaminations, is furthermore supplied to the diluting tank 8 where its consistency is adjusted to a value required for fractionizing. The suspension is then forwarded by a pump 9 to the first-stage fractionizer 10 where unrequired very fine fractions and broken fibers are removed. The long fibers are supplied to the thickener 11 where the unnecessary part of water is removed from the suspension prior to its supply to the activizer 12. The thickened long fiber material is exposed in the activizer to the influence of kneading means which subject the surfaces of the fiber to a mutual friction thereby improving their bonding activity. After passage through the activizer, the long fiber fraction is diluted and its concentration is reduced in a mixing tank 13, and is then pumped by a mixing pump 14 to the screen classifier 15, where it is deprived of the finest unpulped fractions and of parts of foils of plastic material. The suspension of the long fiber fraction is thereafter supplied to the first-stage and then to the second-stage of the groove classifier 16, 29, where it is deprived of fiber packs, particles of foam polystyrene, and of larger point-shaped contaminations. The thus preliminarily classified suspension of the long fiber fraction is finally classified on a three-stage battery of centrifugal separators 19, 22, 25, which insure the finest classification of point-shaped contaminations, and having a rather favorable influence on the visual properties of the thus obtained fibrous material, which, in the final stage, is thickened on a thickener 26 and supplied for further treatment.

In the drawing outlets of the various components to waste are indicated by a large Y. The bottom outlet for the short fraction from the first-stage fractionizer 10 is designated 10b, and the top outlet for the long fraction from the first-stage fractionizer 10 is designated 10a.

The bottom outlet for the classified suspension from screen classifier 15 is designated 15a, and the top outlet for the components flushed out of the screen classifier 15 is designated 15b. Outlet 15b is connected to the classifier 7 of large components as shown. The bottom outlet for the classified suspension from the second stage 29 of the groove classifier 16, 29 is designated 29b, and the top outlet for the flushed-out components from stage 29 of groove classifier 16, 29 is designated 29a. Outlet 29a is connected to the mixing tank 13 as shown.

The bottom outlet of vibrating screen 30 is connected by a conduit 30a to the classifier 7 of large components. The top outlet of centrifugal separator 19 is connected to the thickener 26 of the long fraction through conduit 19a. The top outlet of centrifugal separator 25 is connected to tank 23 by conduit 25a. The top outlet of centrifugal separator 22 is connected to tank 17 by conduit 22a.

As the arrangement according to this invention is composed of currently manufactured components with the exception of the fractionizers in a novel combination securing its novel effect, its realization is possible with low investment costs in any plant processing collected low-grade waste paper.

Although the invention is illustrated and described with reference to one preferred embodiment thereof, it is to be expressly understood that it is in no way limited to the disclosure of such preferred embodiment but is capable of numerous modifications within the scope of the appended claims.

We claim:

1. An arrangement for processing low-grade collected waste paper, comprising means for pulping and pre-classifying low-grade waste paper material, a diluting tank, conduit means connecting the means for pulping and pre-classifying the low-grade waste paper material to the diluting tank to forward the pulped and pre-classifying waste paper material to the diluting tank, the arrangement having a first section comprising a first-stage fractionizer with an outlet for the short fraction of the waste paper material delivered thereto from the diluting tank and an outlet for the long fraction of the waste paper material delivered thereto from the diluting tank, conduit means for feeding the pulped and pre-classifying waste paper from the diluting tank to the first-stage fractionizer, a second-stage fractionizer, the second-stage fractionizer having an outlet for the short fraction and an outlet for the long fraction of the material fed thereto from the first-stage fractionizer, conduit means connecting the outlet for the short fraction of the first-stage fractionizer to an inlet of the second-stage fractionizer, a first thickener of the short fiber fraction, and conduit means connecting the outlet of the short fiber fraction of the second-stage fractionizer to the first thickener, the arrangement having a further, second section adapted for the processing of the long fiber fraction separated from the pulped and pre-classified waste paper material by the first-stage fractionizer, such second section comprising a second thickener of the long fiber fraction, an activizer of the long fiber fraction, a second mixing tank, a mixing pump, and a screen classifier connected in that order, conduit means connecting the long fiber outlet of the first stage fractionizer to the second thickener, a groove classifier with an outlet for the classified suspension and an outlet for the flushed-out components, a system of tanks, pumps, and centrifugal separators, and a third thickener for the long fraction, conduit means connecting in that order the outlet of the screen classifier with the inlet of the groove classifier and the groove classifier with the system of tanks, pumps, centrifugal separators, and thickener of the long fraction.

2. An arrangement for processing low-grade collected waste paper as claimed in claim 1, wherein the second-stage fractionizer has a first outlet for the short fraction and a second outlet for the remaining separated components, the outlet of the second-stage fractionizer for the short fraction being connected to the first thickener of the short fraction.

3. An arrangement for processing low-grade collected waste paper as claimed in claim 1, comprising a second-stage groove classifier with a first outlet for the classified fraction and a second outlet for the flushed-out components, a vibrating screen, the outlet for the flushed-out components of the first-stage groove classifier being connected to the inlet of the second-stage groove classifier, the outlet of the second-stage groove classifier for the classified fraction being connected to the vibrating screen and also to a tank for collecting pulped material, the outlet of the vibrating screen for the flushed-out components being connected to the mixing tank upstream of the screen classifier.

4. An arrangement for processing low-grade collected waste paper as claimed in claim 1, comprising a separator of coarse components upstream of the diluting tank for collecting the pulped and pre-classified material, the outlet of the screen classifier for the flushed-out components being connected to said separator of coarse components.

* * * * *